United States Patent
Mullender et al.

(10) Patent No.: US 11,695,769 B2
(45) Date of Patent: Jul. 4, 2023

(54) DYNAMIC USER AUTHORIZATION WITH A SERVICE PROVIDER

(71) Applicant: Cisco Technology, Inc., San Jose, CA (US)

(72) Inventors: Sape Jurrien Mullender, Amsterdam (NL); Hendrikus G. P. Bosch, Aalsmeer (NL); Alessandro Duminuco, Milan (IT); Ahmed Bakry Helmy Ahmed, Enschede (NL); Aaron T. Woland, Waxhaw, NC (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 16/989,234

(22) Filed: Aug. 10, 2020

(65) Prior Publication Data

US 2022/0046018 A1    Feb. 10, 2022

(51) Int. Cl.
*H04L 29/06* (2006.01)
*H04L 9/40* (2022.01)

(52) U.S. Cl.
CPC ............................ *H04L 63/0892* (2013.01)

(58) Field of Classification Search
CPC .................................................. H04L 63/0892
See application file for complete search history.

(56) References Cited

U.S. PATENT DOCUMENTS

| | | | |
|---|---|---|---|
| 2006/0218628 A1* | 9/2006 | Hinton | H04L 63/0815 726/8 |
| 2007/0157304 A1 | 7/2007 | Logan | |
| 2013/0246630 A1* | 9/2013 | Exton | G06F 16/9535 709/227 |
| 2015/0121481 A1* | 4/2015 | Venkatanaranappa | H04L 63/0815 726/5 |
| 2016/0205108 A1* | 7/2016 | Si | H04L 63/126 726/4 |
| 2018/0198786 A1* | 7/2018 | Shah | H04W 12/069 |
| 2018/0288048 A1* | 10/2018 | Gibbons | H04W 12/08 |

(Continued)

OTHER PUBLICATIONS

Ahmed, A.B.H. (2020) Balancing security and usability in Web Single Sign-On.; http://essay.utwente.nl/81458/7/Ahmed_MA_EEMCS.pdf (Year: 2020).*

(Continued)

*Primary Examiner* — Saleh Najjar
*Assistant Examiner* — Devin E Almeida
(74) *Attorney, Agent, or Firm* — Lee & Hayes, P.C.

(57) ABSTRACT

This disclosure describes techniques for dynamically changing a user authorization with a service provider during an ongoing user session. The changing user authorization may be used to address changing confidence in an identity of a user consuming a service provided by the service provider. The changing user authorization may also be used to adjust a scope of a service to which a user has access. The present techniques may allow single-sign-on type protocols to accomplish the flexible and dynamic change-of-authorization functionality of some traditional protocols to handle ongoing client-server sessions, rather than simply revoking authorization for access to the service. For this reason, the present techniques are able to integrate advantages of traditional protocols with newer, single-sign-on-type protocols.

20 Claims, 10 Drawing Sheets

(56) References Cited

U.S. PATENT DOCUMENTS

| | | | | |
|---|---|---|---|---|
| 2019/0095598 | A1* | 3/2019 | Kobayashi | G06F 21/44 |
| 2019/0116153 | A1* | 4/2019 | Deverakonda Venkata | |
| | | | | H04L 63/10 |
| 2019/0199723 | A1* | 6/2019 | Tak | H04L 63/0807 |
| 2020/0099685 | A1* | 3/2020 | Wijaya | H04L 67/22 |
| 2020/0213297 | A1* | 7/2020 | Suraparaju | H04L 63/0892 |
| 2021/0037011 | A1* | 2/2021 | Kelley | H04L 63/0823 |
| 2022/0217132 | A1 | 7/2022 | Ahmed | |

OTHER PUBLICATIONS

Mohammad Ghasemisharif, "O single sign-off, where art thou? an empirical analysis of single sign-on account hijacking and session management on the web". In Proceedings of the 27th USENIX Conference on Security Symposium (SEC'18). (Year: 2018).*

Apache; Apache HTTP Server Vresion 2.4; Virtual Host Examples; [Online} at «<https://httpd.apache.org/docs/2.4/vhosts/examples.html»>, Jun. 29, 2020; 7 Pages.

Armando et al., Formal Analysis of SAML 2.0 Web Browswer Single Sign-On: Breaking the SAML-Based Single Sign-On for Google Apps; Proc. of the 6th ACM Workshop on Formal Methods in Security Engineering, FMSE 2008, Alexandria, VA, USA, Oct. 27, 2008, 9 Pages.

Bakar et al.; Adaptive Authentication Based On Analysis of User Behavior; Proceedings of 2014 Science and Information Conference, SAI 2014, Aug. 27-29, 2014; pp. 601-606.

Bakry, Ahmed; True SSO Demo; [Online] at «<https://drive.google.com/drive/folders/1ldg-h3LtBuWoxwH3GGC6728Lh7gUn6ZU»>; May 3, 2020, 2 Pages.

Caha, Thomas; IP2GEOTOOLS 0.1.5, Simple Tool for Getting Geolocation Information on Given IP Address from Various Geolocation Databases;Apr. 15, 2019; [Online] Available at «<https://pypi.org/project/ip2geotools/0.1.5/»>.

Chiba et al.; Dynamic Authorization Extensions To Remote Authentication Dial in User Service (Radius); Internet Engineering Task Force, Request for Comment, vol. 3576, pp. 1-25, Jul. 1, 2003.

Cox et al.; Security in Plan 9 Conference: Proceedings of the 11th USENIX Security Symposium, San Francisco, CA, USA, Aug. 5-9, 2002, 20 Pages.

Czeskis et al.; Strengthening User Authentication Through Opportunistic Cryptographic Identity Assertions, 19th ACM Conference on Computer and Communications Security, Oct. 16-18, 2012, 11 Pages.

Domingos et al.; Mining High-Speed Data Streams; in Proceedings of the Sixth ACM SIGKDD International Conference on Knowledge Discovery and Data Mining, 2000, published Aug. 1, 2000, pp. 71-80.

Duo; Duo Mobile App; [Online] at «<https://duo.com/product/multi-factor-authentication-mfa/duo-mobile.app; Viewed Jun. 29, 2020, 9 Pages.

Duo; Webauth Guide; [Online} at «<webauthn.guide»>, Jun. 29, 2020, 15 Pages.

Fielding et al., Hypertext Transfer Protocol—HTTP/1.1; The Internet Society, Jun. 1999; [Online} Available at «<https://www.rfc-editor.org/rfc/rfc2616»>, 176 Pages.

Freeman et al.; Who Are You? A Statistical Approach To Measuring User Authenticity; in DNSS 16, Feb. 21-24, 2016, pp. 1-15.

Binkley, Daniel; GLUU Web Authentication / SSO Protocol Adoption Predictions, Dec. 17, 2013, Online Presentation Available at «<https://www.slideserve.com/gluu/gluu-web-authentication-sso-protocol-adoption-predictions»>, 3 Pages.

Harilal, Athul & Toffalini, Flavio & Castellanos, John & Guarnizo, Juan & Homoliak, Ivan & Ochoa, Martin. (2017). TWOS: A Dataset of Malicious Insider Threat Behavior Based on a Gamified Competition, MIST '17 Proceedings of the 2017 International Workshop on Managing Insider Security Threats, Oct. 30, 2017, pp. 45-56.

Herley et al., Passwords: If We're so Smart, Why Are We Still Using Them?; Proc. Financial Crypto, Jan. 2009, Published Apr. 3, 2009, 8 Pages.

Hughes et al.; Security Assertion Markup Language (SAML) V2.O Technical Overview; Oasis SSTC Working Draft sstc-saml-tech-overview-2.0-draft-08, pp. 29-38, Mar. 25, 2008.

Karapanos et al.; Sound-Proof Usable Two-Factor Authentication Based On Ambient Sound; in 24th USENIX Security Symposium, USENIIX Security 15, Aug. 12-14, 2015, pp. 483-498.

Kohl et al, The Kerberos Network Authentication Service V5, Network Working Group RFC 1510, Digital Equipment Corporation, Sep. 1, 1993, Available at «<https://www.rfc-editor.org/rfc/rfc1510»>, 112 Pages.

Kranch et al.; Upgrading HTTPS in Mid-Air: an Empirical Study of Strict Transport Security and Key Pinning; NDSS'15: The 2015 Network and Distributed Security Symposium, Feb. 8-15, 2015; 15 Pages.

Kristol et al.; HTTP State Management Mechanism; RFC 2965, Bell Laboratories and Lucent Technlologies, Oct. 1, 2020, 26 Pages.

Lamport, Leslie; Password Authentication With Insecure Communication; Communications of the ACM, Nov. 1981, vol. 24, No. 11, 3 Pages.

Lodderstedt et al.; Oath 2.0 Token Revocation; IETF RFC 7009, Aug. 1, 2013, Available at «<https://www.rfc-editor.org/rfc/rfc7009»>, 11 Pages.

Lodderstedt et al.; Oath 2.0 Threat Model and Security Considerations; IETF2013, RFC 6819; Jan. 1, 2013, 71 Pages.

Marforio et al.; Smartphones as Practical ANS Secure Location Verification Tokens for Payments; Network and Distributed System Security Symposium, Jan. held 2014, Sandiego, CA, Published Feb. 1, 2014 in NDSS '14, 15 Pages.

Microsoft; System Isolated Storage; [Online] Available at https://docs.microsoft.com/en-us/dotnet/standard/io/isolated-storage, Mar. 30, 2017, 9 Pages.

Modlishka; Duszyski Phishing Tool; [Online] at https://github.com/drk1wi/Modlishka; 2002;19 Pages.

OASIS Security Services TC, Security Assertion Markup Language (SAML) V2.0 Technical Overview; Committee Draft 02, Mar. 25, 2008, Available at «<http://docs.oasis-open.org/security/saml/Post2.0/sstc-saml-tech-overview-2.0.html»>, 56 Pages.

Preuveneers et al.; Smartauth: Dynamic Context Fingerprinting for Continuous User Authentication; SAC'15, Proceedings fo the 30th Annual ACM Symposium on Applied Compuring, Apr. 13-17, 2015, published Apr. 13, 2015,pp. 2185-2191.

C. C. Rocha, J. C. D. Lima, M. A. R. Dantas and I. Augustin, "A2BeST: An adaptive authentication service based on mobile user's behavior and spatio-temporal context," 2011 IEEE Symposium on Computers and Communications (ISCC), Kerkyra, Greece, Jun. 28-Jul. 1, 2011, pp. 771-774.

Sakimura et al.; Openid Connect Core 1.0 Incorporating Errata Set 1; Nove. 8, 2014; [Online] Available at «<https://openid.net/specs/openid-connect-core-1_0.html»>, 86 Pages.

Salton et al.; A Vector Space Model for Automatic Indexing; Communication of the ACM, vol. 18, No. 11, Nov. 1, 1975, pp. 613-620.

Sasse et al., Debunking Security-Usability Tradeoff Myths, IEEE Security and Privacy, 14(5), Roundtable Sep./Oct. 2016, Published Oct. 25, 2016; pp. 33-39; Available at «<https://discovery.ucl.ac.uk/id/eprint/1530499/»>.

Sasse et al., Usable Security: Why Do We Need It? How Do We Get It?, In Canor et at al., Security and Usability: Designing Secure Systems That People Can Use, Aug. 5, 2005, O'Reily: Sebastopol, US, Available at «<https://discovery.ucl.ac.uk/id/eprint/20345/»>, (pp. 13-30).

Shirvanian et al.; Two-Factor Authentication Resilient To Server Compromise Using Mix-Bandwidth Devices; NDSS '14, Feb. 23-26, 2014, San Diego, Ca, 16 Pages.

Sivakorn et al.; The Cracked Cookie Jar: HTTP Cookie Hijacking and the Exposure of Private Information; in 2016 IEEE Symposium on Security and Privacy (SP); IEEE, May 22, 2016, pp. 724-742.

Simplesamlphp; [Online} Retrieved from «<simplesamlphp.org»>, UNINETT; May 13, 2020, 3 Pages.

Solano, J., Camacho, L., Correa, A., Deiro, C., Vargas, J., Ochoa, M. (2019). Risk-Based Static Authentication in Web Applications with Behavioral Biometrics and Session Context Analytics. In: , et al.

(56) References Cited

OTHER PUBLICATIONS

Applied Cryptography and Network Security Workshops. ACNS 2019. Lecture Notes in Computer Science, vol. 11605.Jun. 5, 2019 Springer, pp. 3-23.

Symeonidis et al., SARL: A Revocation Mechanism for Long Lived Assertions On Shibboleth, COSIC Technical Report, Published May 20, 2014, Available at «<https://www.esat.kuleuven.be/cosic/publications/article-2528.pdf»>, 7 Pages.

Teamsid.; Worst Passwords Of 2019; Online at «<https://teampassword.com/blog/top-50-worst-passwords-of-2019»>; Dec. 18, 2019, 8 Pages.

Tulshibagwale, Atul, Re-Thinking Federated Identity With the Continuous Access Evaluation Protocol, Google Cloud Blog, Feb. 21, 2019; Available at «<https://cloud.google.com/blog/products/identity-security/re-thinking-federated-identity-with-the-continuous-access-evaluation-protocol»>, 8 Pages.

Verizon; 2019 Data Breach Investigations Report; Jan. 1, 2019; [Online] Available at «<https://www.verizon.com/business/resources/reports/dbir/#archive»>, 78 Pages.

* cited by examiner

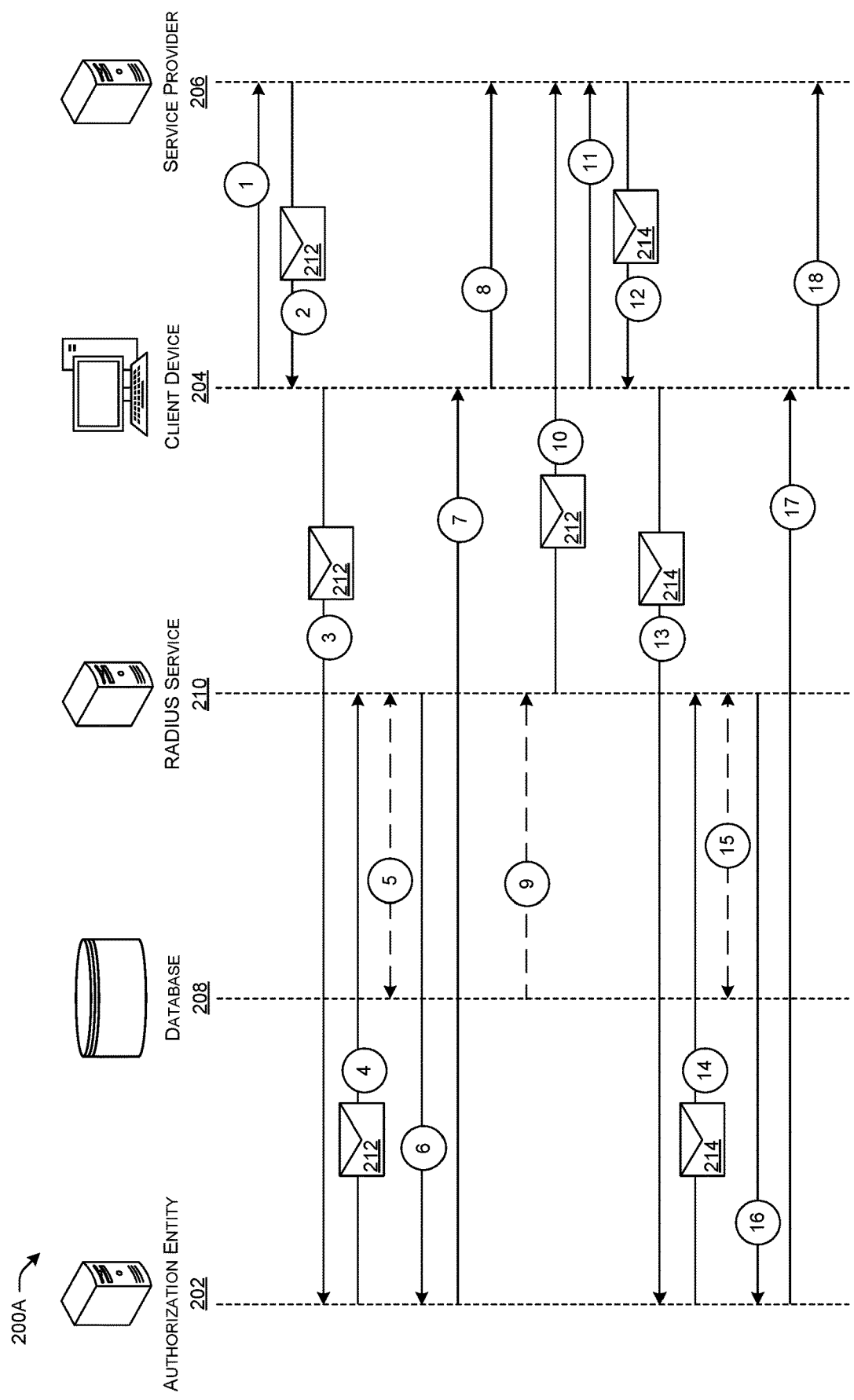

500

```
┌─────────────────────────────────────────────────────────────┐
│  RECEIVE, AT THE SERVER DEVICE AND FROM A CLIENT DEVICE,    │
│  A COMMUNICATION OF A REQUEST FOR THE CLIENT DEVICE TO ACCESS│
│  A SERVICE PROVIDED BY A SERVICE PROVIDER, THE COMMUNICATION │
│  INCLUDING A CALL-BACK ADDRESS ASSOCIATED WITH THE SERVICE   │
│  PROVIDER                                                    │
│                            502                               │
└─────────────────────────────────────────────────────────────┘
                              ↓
┌─────────────────────────────────────────────────────────────┐
│        DETERMINE THAT THE CLIENT DEVICE IS AUTHORIZED        │
│        TO ACCESS THE SERVICE FROM THE SERVICE PROVIDER       │
│                            504                               │
└─────────────────────────────────────────────────────────────┘
                              ↓
┌─────────────────────────────────────────────────────────────┐
│        SEND AN AUTHORIZATION NOTIFICATION TO THE CLIENT DEVICE│
│        BASED AT LEAST IN PART ON DETERMINING THAT THE CLIENT │
│        DEVICE IS AUTHORIZED TO ACCESS THE SERVICE            │
│                            506                               │
└─────────────────────────────────────────────────────────────┘
                              ↓
┌─────────────────────────────────────────────────────────────┐
│     DETERMINE THAT A CHANGE IN AUTHORIZATION HAS OCCURRED    │
│     RELATIVE TO THE CLIENT DEVICE ACCESSING THE SERVICE      │
│                            508                               │
└─────────────────────────────────────────────────────────────┘
                              ↓
┌─────────────────────────────────────────────────────────────┐
│     BASED AT LEAST IN PART ON THE CHANGE IN AUTHORIZATION,   │
│  UTILIZE THE CALL-BACK ADDRESS TO NOTIFY THE SERVICE PROVIDER│
│     THAT THE CHANGE IN THE AUTHORIZATION HAS OCCURRED        │
│                            510                               │
└─────────────────────────────────────────────────────────────┘
```

```
┌─────────────────────────────────────────────────────────────────┐
│ RECEIVING AT A SERVICE PROVIDER AND FROM A CLIENT DEVICE, A     │
│ REQUEST FOR THE CLIENT DEVICE TO ACCESS A SERVICE PROVIDED BY   │
│ THE SERVICE PROVIDER                                            │
│                              602                                │
└─────────────────────────────────────────────────────────────────┘
                                │
                                ▼
┌─────────────────────────────────────────────────────────────────┐
│ RETURNING TO THE CLIENT DEVICE THE REQUEST WITH REDIRECT        │
│ INSTRUCTIONS AND A CALL-BACK ADDRESS RELATED TO THE SERVICE     │
│ PROVIDER                                                        │
│                              604                                │
└─────────────────────────────────────────────────────────────────┘
                                │
                                ▼
┌─────────────────────────────────────────────────────────────────┐
│ RECEIVING AT THE SERVICE PROVIDER AND FROM THE CLIENT DEVICE,   │
│ AN INDICATION OF A TRUSTED AUTHORIZATION FOR THE CLIENT DEVICE  │
│ TO ACCESS THE SERVICE PROVIDED BY THE SERVICE PROVIDER          │
│                              606                                │
└─────────────────────────────────────────────────────────────────┘
                                │
                                ▼
┌─────────────────────────────────────────────────────────────────┐
│ BASED AT LEAST IN PART ON RECEIVING THE TRUSTED AUTHORIZATION,  │
│ GRANTING ACCESS TO THE SERVICE BY THE CLIENT DEVICE             │
│                              608                                │
└─────────────────────────────────────────────────────────────────┘
                                │
                                ▼
┌─────────────────────────────────────────────────────────────────┐
│ RECEIVING AT THE SERVICE PROVIDER AND FROM A THIRD PARTY,       │
│ A COMMUNICATION INDICATING THAT A CHANGE IN AUTHORIZATION HAS   │
│ OCCURRED RELATIVE TO THE ACCESS OF THE SERVICE BY THE CLIENT    │
│ DEVICE                                                          │
│                              610                                │
└─────────────────────────────────────────────────────────────────┘
                                │
                                ▼
┌─────────────────────────────────────────────────────────────────┐
│ BASED AT LEAST IN PART ON THE COMMUNICATION FROM THE THIRD      │
│ PARTY INDICATING THAT THE CHANGE IN THE AUTHORIZATION HAS       │
│ OCCURRED, ADJUSTING THE ACCESS OF THE CLIENT DEVICE             │
│ TO THE SERVICE PROVIDED BY THE SERVICE PROVIDER                 │
│                              612                                │
└─────────────────────────────────────────────────────────────────┘
```

FIG. 6

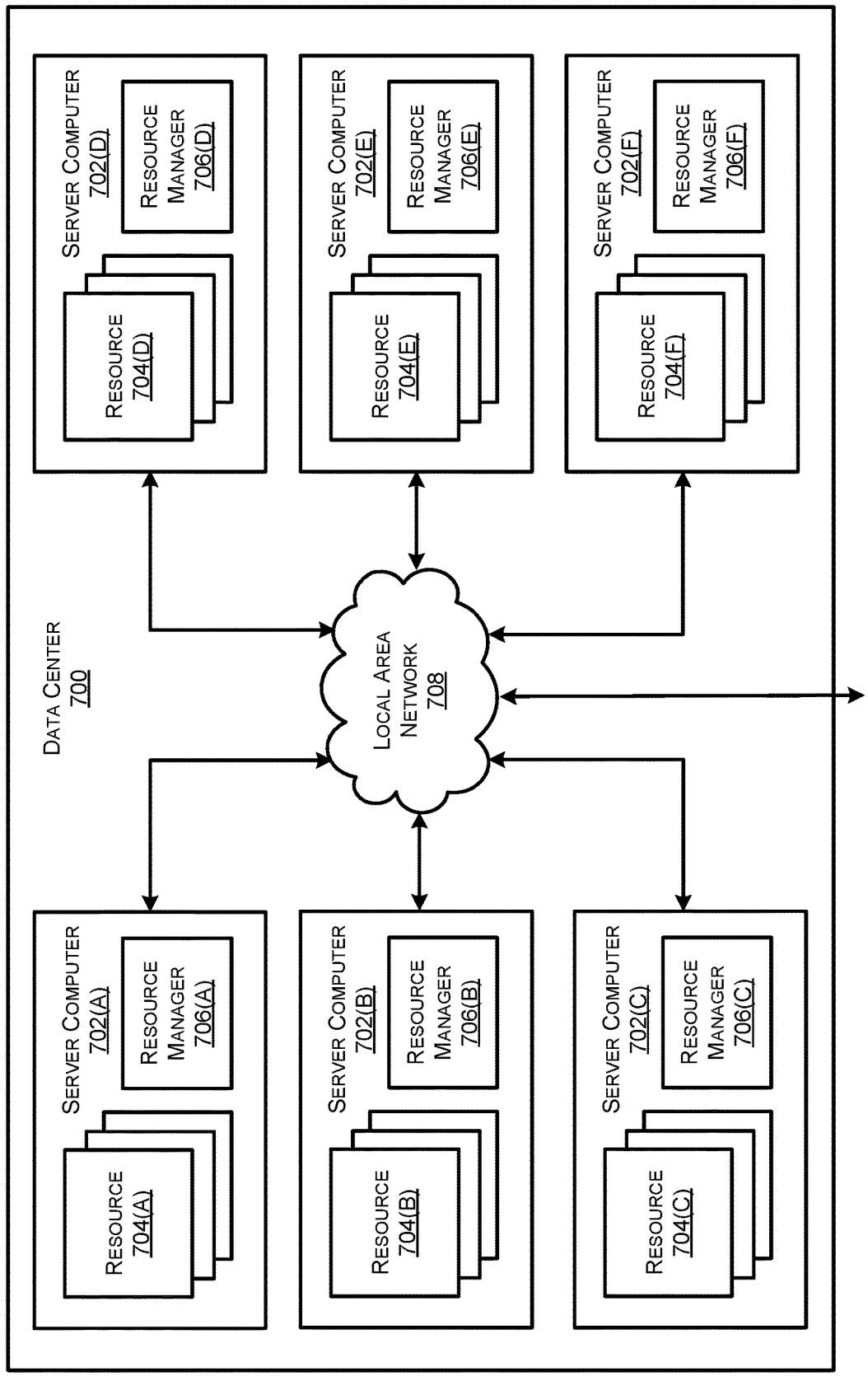

DYNAMIC USER AUTHORIZATION WITH A SERVICE PROVIDER

TECHNICAL FIELD

The present disclosure relates generally to dynamically changing a user authorization with a service provider during an ongoing user session. The changing user authorization may be used to address changing confidence in an identity of a user consuming services provided by the service provider.

BACKGROUND

Traditional authentication, authorization, and accounting (AAA) services may be used to help a service provider manage users of a service, such as a remote-access web service. AAA services may be viewed as controlling access to resources of the service provider, enforcing policies, and managing information related to billing for the service. For example, authentication may include identifying a user, typically by validating a username and/or password before access is granted to a service. Authorization may include determining whether the user has authority and/or permission to perform various tasks associated with the service, such as issuing a command. Accounting may include measuring resources consumed by the user during a session, including system time, an amount of data sent or received by the user, etc. AAA services are important for effective network management and security, and are often provided by a dedicated AAA server (e.g., identity provider). Furthermore, a particular AAA protocol may be used to interface between the identity provider and a service provider.

One example of a AAA protocol is Remote Authentication Dial-In User Service (RADIUS). For example, RADIUS may be viewed as having a client-server architecture in which a RADIUS client (service provider) makes an authentication (or an accounting) request and the RADIUS server responds. However, other protocols, including those used in single-sign-on procedures, may be used to provide AAA services to a service provider. Increasingly, modern network infrastructures are using Security Assertion Markup Language (SAML) to communicate AAA services between an identity provider and a service provider. Techniques may be needed to ensure the capability and flexibility of the RADIUS type service may continue to be provided through alternative AAA protocols, such as SAML.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 4-6 illustrate flow diagrams of example methods for dynamically changing user authorization as a part of communications among network devices, in accordance with the present concepts.

FIG. 7 illustrates a computing system diagram illustrating a configuration for a data center that can be utilized to implement aspects of the technologies disclosed herein.

DESCRIPTION OF EXAMPLE EMBODIMENTS

Overview

Figure 1:
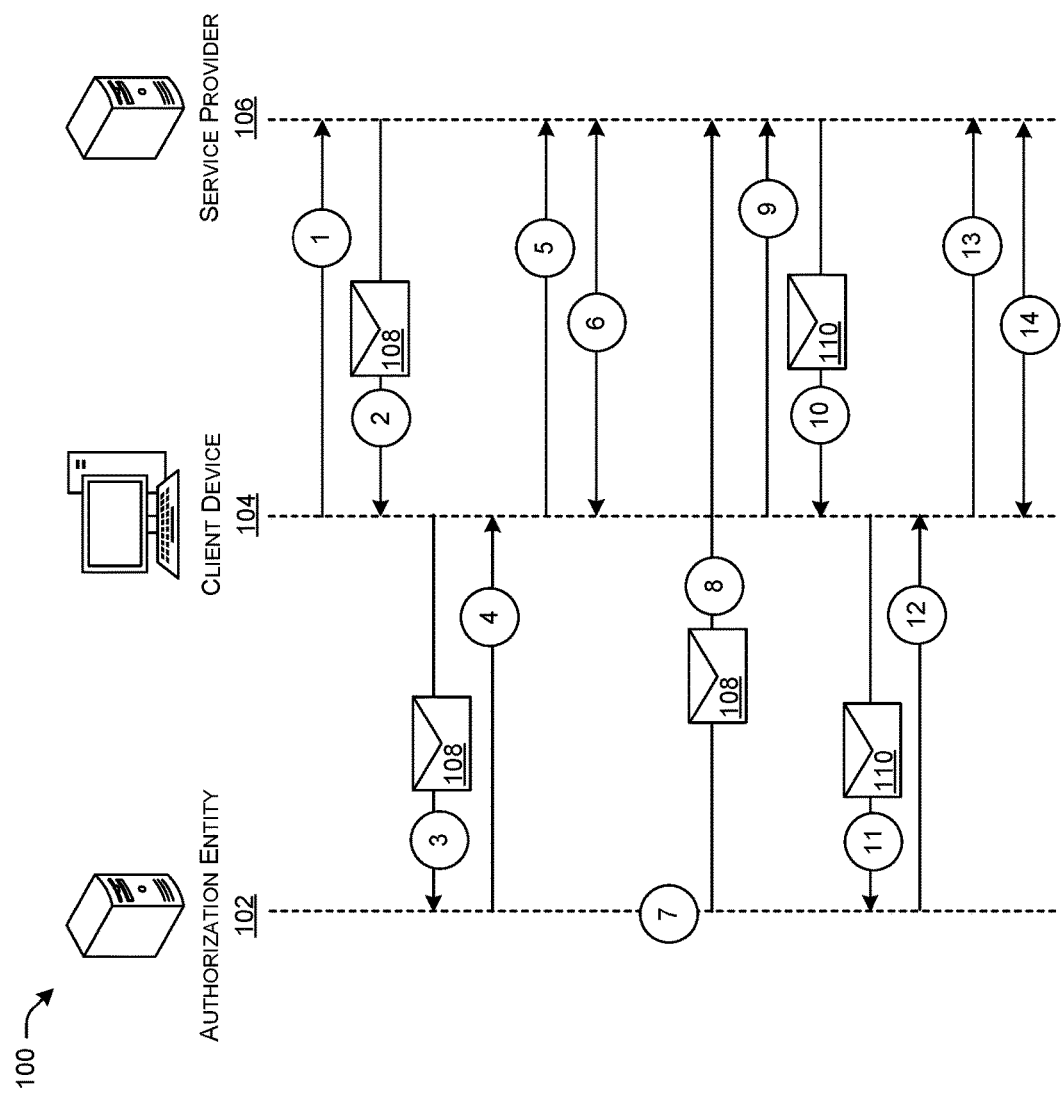
FIGS. 1-3B illustrate example data flow diagrams in which user authorization may be dynamically changed as part of communications between network devices, in accordance with the present concepts.

This disclosure describes, at least in part, a method that may be implemented by an authorization entity communicatively coupled to a client device, a service provider, and/or other devices. The method may include receiving, at the authorization entity and from the client device, a communication of an access request for the client device to access a service provided by the service provider. The communication may include a call-back address associated with the service provider. The method may include communicating the request to an intermediary service to determine whether the client device has authorization to access the service provided by the service provider. The method may also include receiving confirmation from the intermediary service that the client device has authorization to access the service provided by the service provider. In response to receiving the confirmation, the method may include communicating the authorization to the client device. The method may also include providing the call-back address to the intermediary service for use in an instance where a change in the authorization occurs.

This disclosure also describes, at least in part, a method that may be implemented by server device (e.g., an identity provider) communicatively coupled to a client device, a service provider, and/or other devices. The method may include receiving, at the server device and from the client device, a communication of a request for the client device to access a service provided by the service provider, the communication including a call-back address associated with the service provider. The method may include determining that the client device is authorized to access the service from the service provider. The method may also include sending an authorization notification to the client device based at least in part on determining that the client device is authorized to access the service. Further, the method may include determining that a change in authorization has occurred relative to the client device accessing the service. Based at least in part on the change in authorization, the method may include utilizing the call-back address to notify the service provider that the change in authorization has occurred.

This disclosure also describes, at least in part, a method that may be implemented by service provider communicatively coupled to a client device and/or other devices. The method may include receiving, at the service provider and from the client device, a request for the client device to access a service provided by the service provider. The method may include returning to the client device the request with redirect instructions and a call-back address related to the service provider. The method may also include receiving, at the service provider and from the client device, an indication of a trusted authorization for the client device to access the service provided by the service provider. Based at least in part on receiving the trusted authorization, the method may include granting access to the service by the client device. Further, the method may include receiving, at the service provider and from a third party, a communication indicating that a change in authorization has occurred relative to the access of the service by the client device. Based at least in part on the communication from the third party indicating that the change in the authorization has occurred, adjusting the access of the client device to the service provided by the service provider.

Additionally, the techniques described herein may be performed by a system and/or device having non-transitory computer-readable media storing computer-executable instructions that, when executed by one or more processors, performs the methods described above.

Example Embodiments

Authentication, authorization, and accounting (AAA) services may include support for establishing and tearing down a user session between a user and a service provider. Change-of-Authorization (CoA) procedures may be helpful for AAA services to convey revocation of authorization, or, more subtly, changes of authorization. For example, in accordance with the present techniques, a service provider may signal a call-back (e.g., call-back address) to a AAA service in order to facilitate CoA procedures. In some instances, when a CoA needs to be enforced, the call-back can be triggered to revoke an earlier authorization, which may cause the service provider to require a re-authentication and/or re-authorization. Thus, the present techniques allow AAA services to accomplish flexible and dynamic functionality of CoA procedures to handle ongoing client-server sessions.

In general, CoA procedures may be employed to address a wide variety of changes relative to a user session with a service provider. CoA procedures may include immediately ending a user's session, disconnecting them from the network or resource. Such a revocation of authorization may be due to a security breach, for instance. However, a more subtle changes of authorization, rather than outright revocation of authorization, may be a more nuanced capability to provide. Examples of CoA events may include changes relative to a user, a device, and/or application posture in an enterprise network, such as changing confidence in an identity of a user consuming services provided by the service provider. Examples may also include changed access rules for (web and/or VPN) services consumed by an enterprise user, etc. In one example, an authorization of a user may be about to expire, and may be extended via a replacement SAML statement being made available to the service provider. In another example, an authorization of a user may be extended to more, or reduced to fewer, objects or operations. CoA may be used to force a re-authentication and/or re-authorization of the user with new conditions being examined, resulting in a new level of access for the user. In a dynamic posture-assessment environment, confidence in trust of a user or a user device may vary. For example, a command may originate from a user device while there are indications that the user is not in the immediate proximity of the user device. In response, it may be appropriate or desirable to temporarily curtail authorization of the user. CoA may be used to push an immediate change, such as ACL changes, moving VLANs, or more. In some examples, a CoA procedure may be a way for an identity provider to "warn" a service provider of an event, such as a change in a posture of the device of a user, or when malicious activity by another system triggers a change.

Traditionally, service providers have used Remote Authentication Dial-In User Service (RADIUS) or similar protocols to obtain authorizations from an identity provider. The RADIUS protocol allows the identity provider to update the authorizations dynamically and asynchronously—for example, an authorization could be revoked, or more or less access rights to services could be enforced. However, protocols and/or standards used in single-sign-on procedures are increasingly being used to provide AAA services to a service provider. Some examples of such protocols and/or standards may include Security Assertion Markup Language (SAML), Open Authentication (OAuth) (e.g., OAuth 2.0), OpenID Connect (OIDC), etc. Single-sign-on may be used to gain access to a cloud application and/or for cloud-based remote-access services for many vendors. RADIUS may be viewed as having a client-server architecture. For instance, a RADIUS client makes an authentication (or an accounting) request and the RADIUS server responds. This type of interaction may be easily translated into SAML, for example, because SAML, too, may be viewed as client-server oriented. To make a conversion from RADIUS to SAML, RADIUS requests and responses may be translated into SAML versions. However, RADIUS and other protocols (e.g., DIAMETER) also have CoA procedures that may not strictly follow the client-server communication pattern. Therefore, it may be difficult to translate the CoA procedures from older protocols, such as RADIUS, to protocols for newer single-sign-on procedures, such as SAML.

Continuing with the example of SAML as a protocol for a single-sign-on procedure, in a case where the authorization of a user using a service changes, at best the service provider may only use short-lived SAML statements and/or require periodic polling of the service provider to obtain a changed authorization. This is undesirable as it may create load on the service provider, the identity provider, and/or may create disruptions to the service. Therefore, single-sign-on procedures may lack important capabilities embodied in the RADIUS-type functionality, such as signaling to a service provider that a change of authorization is required during a user session. Stated another way, using SAML for communicating authorizations between the identity provider and service provider—which appears to be the direction the industry is going—may provide a great deal less flexibility for communicating changing authorizations in an ongoing session. Techniques may be needed to address continuously changing confidence in user identity and/or continuously changing authorizations for users consuming services provided by a service provider. The present techniques allow protocols for single-sign-on procedures to accomplish the flexible and dynamic functionality of a RADIUS-type protocol to handle ongoing client-server sessions.

Furthermore, although many service providers and/or browsers are using SAML-based cookies and/or SAML statements for authentication and authorization, many security infrastructures and/or procedures may still be based on legacy protocols, such as RADIUS, DIAMETER, OAuth 2.0, etc. A relatively long time may pass before such older protocols are phased out. For this reason, techniques may be needed to integrate, or bridge between, traditional protocols and newer, single-sign-on-type protocols. Also, novel identity provider-based CoA procedures may be needed to enable new cloud-based security product features with integrated and automatic posture operations. The present techniques allow RADIUS-type capabilities to be fluidly integrated into modern (e.g., SAML-based) infrastructures. The present techniques also represent minimal changes to SAML and implement the changes in backward-compatible ways where possible.

A "call-back" concept (e.g., a call-back address) may be used to relay CoA events between service providers and identity providers in ongoing user sessions. A call-back is one example mechanism for dynamically processing important security events (and/or other CoA events) for ongoing sessions where service providers are relying on SAML-based authentication and authorization. The present techniques show how CoA events can dynamically be delivered between servers employing legacy protocols (e.g., RADIUS, DIAMETER) and SAML-based service providers. Perhaps most importantly, the call-back mechanism is capable of dynamically changing an authorization without terminating a user session. Therefore, with the present techniques, a backwards-compatible integration between RADIUS and SAML may be achieved.

Although the examples described herein may refer to service providers and identity providers as dynamically changing a user authorization, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a data flow diagram of an example traffic flow 100 in accordance with the present concepts. As shown, the traffic flow 100 includes various hardware and/or software resources, such as an authorization entity 102, a client device 104, and a service provider 106. Example traffic flow 100 may include communications exchanged between the authorization entity 102, the client device 104, and/or the service provider 106 for the purpose of dynamically providing a CoA in associated with an authentication, authorization, and accounting (AAA)-type service. As used herein, an "authorization entity" may refer to any entity providing AAA-type services, such as an authorization server, an identity provider, etc. Also as used herein, a "client device" may refer to any device related a user, including any personal device and/or computer, mobile device, laptop, etc., associated with the user. Additionally, "client device" may also refer to a user agent, which may be embodied in a separate physical device from the device of the user. Accordingly, actions described as being performed by a client device may be performed by the actual device of the user and/or by a user agent.

The authorization entity 102, client device 104, and/or service provider 106 may be communicatively coupled to one another and/or to various other devices. The authorization entity 102, client device 104, service provider 106, and/or other devices may exchange communications (e.g., packets) via a network connection(s). For instance, a network connection may be transport control protocol (TCP) network connection or any network connection (e.g., information-centric networking (ICN)) that enables authorization entity 102, client device 104, service provider 106, and/or other devices to exchange packets with other devices via a computing network, such as a cloud computing network. A network connection may represent, for example, a data path between the authorization entity 102, client device 104, service provider 106, and/or other devices. It should be appreciated that the term "network connection" may also be referred to as a "network path." The use of a cloud computing network in this example is not meant to be limiting. Other types of networks are contemplated in accordance with reusable acknowledgment concepts. The service provider 106 may or may not be a producer, a point of generation, and/or an origination of data. For instance, the data may originate elsewhere for the service provider 106 to be able to provide a service to the client device 104. Alternatively or additionally, the data may pass through other network devices (e.g., router, switch) on paths between the authorization entity 102, client device 104, service provider 106, and/or other devices. Further descriptions of an example computing system diagram and an example computer architecture diagram in accordance with the present concepts are provided below relative to FIGS. 7 and 8.

In FIG. 1, example communications between authorization entity 102, client device 104, service provider 106 are indicated with numbered arrows. For example, referring to FIG. 1, at Step 1, service provider 106 may receive an incoming communication from client device 104. The communication in Step 1 may be a request from client device 104 to access a service provided by service provider 106. For instance, the communication in Step 1 may be a GET command. However, the service provider 106 may not recognize or trust the client device 104. For instance, the communication may not include an authorization statement (e.g., in SAML). The request from the client may not have credentials, or any credentials may not be valid, for example. In order to determine whether to provide the requested service to the client device 104, the service provider 106 may need to check an authentication of the client device 104 and/or an authorization of the client device to access the requested service, etc. The service provider 106 may therefore communicate with authorization entity 102 either directly or indirectly to accomplish AAA services.

At Step 2 of FIG. 1, in response to the service request received in Step 1, the service provider 106 may send a communication back to the client device 104. The communication in Step 2 may be a way of indirectly communicating with authorization entity 102. For example, service provider 106 may send a message that includes a redirect to authorization entity 102. The redirect may include an address (e.g., universal resource locator (URL), redirect URL) of the authorization entity 102. In accordance with the present concepts, the communication in Step 2 may also contain a call-back 108 (e.g., call-back mechanism). For instance, the communication in Step 2 may include a call-back address, or call-back URL (CBU), that corresponds to the service provider 106. In some examples, the call-back address may be encoded in the redirect address. In some examples, the call-back mechanism may be a different means of identifying the service provider 106, such as a different type of address. The call-back mechanism may be an internet protocol (IP) address and/or a port designator, for instance.

At Step 3 of FIG. 1, the client device 104 may visit the redirect URL, thereby relaying the call-back 108 to the authorization entity 102. Stated another way, the service provider 106, during the process of accepting a SAML authorization for a user, may relay a call-back 108 to the authorization entity 102 (e.g., identity provider), such as in a SAML request. The call-back 108 may be added as an attribute in an Extensions element in the SAML request. In some examples, the SAML request may be signed by the service provider 106. Signing of the SAML request by the service provider 106 may help prevent cheating via the client device 104, such as by changing the call-back 108 (e.g., changing the address of the call-back 108). After Step 3, the authorization entity 102 now has knowledge of the call-back 108. For instance, when the client device 104 visits a redirect address, information in the redirect URL is made available to the authorization entity 102, including the CBU. In an instance of a CoA, the authorization entity 102 may now be able to use the call-back 108 as the destination for contacting the service provider 106.

In response to the redirected request from the service provider 106 for authentication of the client device 104 (Step 3), the authorization entity 102 may verify an identity of the client device 104 and/or a user of the client device 104, or otherwise authenticate the request for service. In some cases, the authorization entity 102 may consult with another device, an intermediary service, a database, etc., in order to confirm the identity associated with the client device 104, examples of which will be described relative to FIGS. 2A-3B, below.

At Step 4 and Step 5 of FIG. 1, in an instance where an identity of the client device 104 is confirmed and/or verified, the authorization entity 102 may communicate the authentication to the service provider 106. As shown in FIG. 1, the confirmation may be accomplished indirectly, through the client device 104. In some examples, the authorization entity 102 may generate and send an authenticating cookie or other device to the client device 104 (Step 4). The client device may then forward the cookie to the service provider 106 (Step 5) to access the service provided by the service provider 106. In some cases, the communication from the authorization entity 102 in Step 4 may represent the original request from the service provider (Step 2) with valid credentials added.

At Step 6 of FIG. 1, the client device 104 has been authenticated. The service provider 106 may now communicate the service to the client device 104 according to the associated terms and/or policies of the authentication.

Note that some aspects of the process depicted in FIG. 1 may have been simplified for explanation purposes. Additionally or alternatively, other methods of providing the call-back 108 to the authorization entity 102 are contemplated. In some cases, the authorization entity 102 may not specifically generate a response that contains the actual SAML statement containing the client device 104 authorization for the service provider 106. Instead, the authorization entity 102 may send an address (e.g., URL) that refers to an interface of the authorization entity 102 and an identifier for the SAML statement proper. One reason for doing this is that the SAML statement may be quite large. The service provider 106 may then use the URL associated with the authorization entity 102 and the identifier for the SAML statement to fetch the actual SAML statement. In such a request, the service provider 106 may also embed the call-back 108, thus notifying the authorization entity 102 of its call-back address.

At Step 7 of FIG. 1, an event may occur that triggers a potential CoA. Examples of changes that might incur CoA procedures have been provided above. The authorization entity 102 may learn of the need for a CoA via a variety of information sources and/or services, some examples of which will be provided below relative to FIGS. 2A-3B. In response to the potential CoA event, the authorization entity 102 may directly or indirectly activate the call-back 108 to warn the service provider of the potential CoA.

At Step 8 of FIG. 1, the authorization entity 102 may provide the call-back 108 to the service provider 106. Although Step 8 depicts the call-back 108 being provided directly to the service provider 106 from the authorization entity 102, in other cases the call-back 108 may be provided indirectly (examples will be described below relative to FIGS. 2A-3B). In some examples, Step 8 may represent HTTPS-based PUT or POST messages being sent to the service provider 106. The messages may contain information regarding events that affect the authorization state of the client device 104. The messages indicating these events can be encoded as SAML statements signed by the authorization entity 102, for instance, which may allow the service provider 106 to verify the authenticity of the messages. Moreover, the messages can often be updated and/or now SAML statements that can be used to replace previously transmitted SAML statements. In some examples, messages to the service provider 106 may revoke previously issued statements.

At Step 9 of FIG. 1, the service provider 106 may receive another incoming communication from client device 104. The communication in Step 9 may be another request from client device 104 to access the service provided by service provider 106. In response, Steps 10-14 may generally mirror Steps 2-6, the description of which will not be repeated for sake of brevity. However, this time the communication is received after the CoA event has occurred (Step 7). Thus, in Steps 10-14, the authentication provided by the authorization entity 102 may reflect the CoA event, and therefore be associated with a new version of authorization condition, policy, etc., of the service provided by the service provider 106. Accordingly, at Step 10, the service provider 106 may send a communication back to the client device 104 that include a new call-back 110. An address associated with the call-back 108 may be the same or different as the address associated with call-back 108. Regardless, after receiving the call-back 110 in Step 11, the authorization entity 102 is then able to use the call-back 110 as the destination for contacting the service provider 106.

Figure 2B:
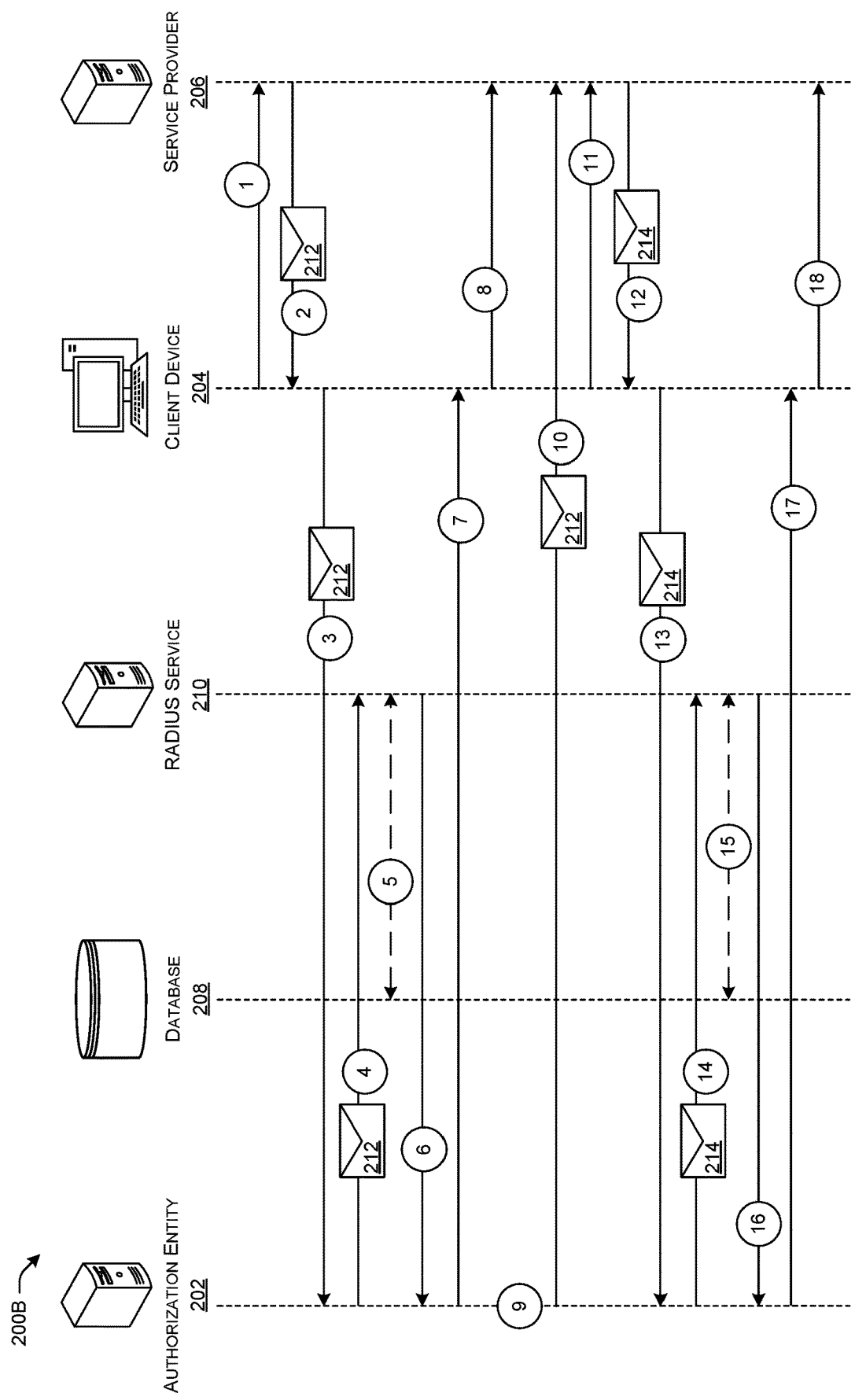

FIGS. 2A and 2B illustrate data flow diagrams of additional example traffic flows 200A and 200B in accordance with the present concepts. Some aspects of the example traffic flows 200A and 200B shown in FIGS. 2A and 2B, respectively, may be similar to aspects of the example described above relative to FIG. 1. Therefore, for sake of brevity, not all elements of FIGS. 2A and 2B will be described in detail. As shown, the traffic flows 200A and 200B include various hardware and/or software resources similar to the traffic flow 100 of FIG. 1, such as an authorization entity 202, a client device 204 (e.g., user agent), and a service provider 206. FIGS. 2A and 2B also show additional hardware and/or software resources, including a database 208 and a RADIUS service 210, which may also be communicatively coupled to each other and/or to the authorization entity 202, client device 204, service provider 206, and/or other devices.

Note that in the example shown in FIG. 2A, the service provider 206 and/or the client device 204 may not be aware of a RADIUS service 210 (e.g., RADIUS authentication system) in the traffic flow 200A. For example, the RADIUS service 210 may interact with the service provider 206 to engage in AAA services without ever contacting either the service provider 206 and/or the client device 204. In some cases, the authorization entity 202 may consult with the RADIUS service 210 in order to confirm an identity associated with the client device 204. Additionally or alternatively, the authorization entity 202 may learn of a CoA event from the RADIUS service 210.

At Step 1 of FIG. 2A, the client device 204 may be trying to connect to the service provider 206, and may communicate identifying information to the service provider 206. Note that in some cases, the communication may come to the service provider 206 via a user agent, rather than directly from a device associated with the user. An example communication at Step 1 may be represented as "GET resource user@realm."

At Step 2 of FIG. 2A, the service provider 206 may not know, recognize, and/or trust the user associated with the client device 204, so it may return a redirect to the authorization entity 202. The redirect is delivered back to the client device 204 (e.g., to a browser). The redirect may include a call-back 212. An example communication at Step 2 may be represented as "REDIRECT [sso.realm.com] resource, user, callback[nonce]," where "nonce" may refer to an identifier associated with the user (e.g., subscriber).

At Step 3 of FIG. 2A, the client device 204 forwards the redirect based on where the redirect points, which is to the authorization entity 202. An example communication at Step 3 may be represented as "GET sso.realm.com resource, user, callback[nonce]." Thus, call-back 212 is provided to the authorization entity 202. In the event of a CoA, the authorization entity 202 now has the means to directly or indirectly use the call-back 212 to get a message to the service provider 206 to warn the service provider 206 of the change.

At Steps 4-6 of FIG. 2A, the authorization entity 202 may interact with the RADIUS service 210 to perform AAA-related services and/or activities. For example, at Step 4, the authorization entity 202 may communicate with the RADIUS service 210 to facilitate a user login screen being presented for the user to enter a password. An example communication at Step 4 may be represented as "access-request user, callback[nonce]." Note at this point that the call-back 212 is also delivered to the RADIUS service 210. Therefore, the authorization entity 202 has enabled to the RADIUS service 210 with the capability to use the call-back 212 to get a message to the service provider 206 to warn the service provider 206 of a potential CoA. In this manner, the authorization entity 202 may indirectly warn the service provider 206, via the RADIUS service 210. Also note that the authorization entity 202 may sign a message that includes the call-back 212 such that the call-back 212 may be trusted by a recipient.

At Step 5 of FIG. 2A, the RADIUS service 210 may access a subscriber state, permissions, and/or other policy information, per a policy for that user. In some examples, the policy information may be stored in database 212, in accordance with active directory (AD) and/or lightweight directory access protocol (LDAP), for instance. Communication at Step 5 is shown with a dashed line to suggest that some back-and-forth communication and/or no communication may be necessary with such a database 208. At Step 6, a communication indicating access being granted to the client device 204 may be sent from the RADIUS service 210 to the authorization entity 202.

At Step 7 of FIG. 2A, the authorization entity 202 is able to communicate that access to the service is being granted to client device 204. For example, the authorization entity 202 may provide a cookie to the client device 204. An example communication at Step 7 may be represented as "DATA response SAML[user, authorized]."

At Step 8 of FIG. 2A, the client device 204 communicates the access grant to the service provider 206. For instance, the client device 204 may forward the cookie to the service provider 206. An example communication at Step 8 may be represented as "DATA response SAML[user, authorized]," similar to Step 7. Since the service provider 206 trusts the authorization entity 202, the service provider 206 therefore trusts the identity of the user. Consequently, the client device 204 is granted access to the service.

At Step 9 of FIG. 2A, a change in status of the user, the client device 204, the service being provided by the service provider 206, and/or some other aspect of the user-service relationship may occur. The change in status may be observed in the database 208, or via another aspect of the RADIUS service 210, for instance. In response to the change in status, the RADIUS service 210 may recognize a potential need for a CoA.

At Step 10 of FIG. 2A, the RADIUS service 210 can engage the call-back 212 to communicate the CoA to the service provider 206. An example communication at Step 10 may be represented as "callback[nonce], POST COA." In response to receiving the CoA message, the service provider 206 may cancel a related authorization, such as that of the user, the client device 204, and/or the subscriber associated with the identifier "nonce." Therefore, for any subsequent incoming request, the service provider 206 may direct the request back to the authorization entity 202.

Accordingly, Steps 12-18 of FIG. 2A may be viewed as roughly repeating the pattern of Steps 2-8. In Steps 12 and 13, a new call-back 214 is provided to the authorization entity 202 so that a message may be sent to the service provider 206 in case of a subsequent CoA. In Step 15, the RADIUS service 210 may learn of new policy information applicable to the client device 204 and/or the user. In Step 16, the RADIUS service 210 may communicate details regarding the new access grant, reflecting the new policy information, to the authorization entity 202. Finally, through Steps 17 and 18, the service provider 206 may learn of access being granted, and begin providing the service to the client device 204.

The traffic flow 200B illustrated in FIG. 2B may be viewed as similar to the traffic flow 200A of FIG. 2A. However, in the example shown in FIG. 2B, the change in status represented as Step 9 may be learned at the authorization entity 302, in this instance. In response to the change in status, the authorization entity 302 may recognize a potential need to notify the service provider 306. In this case, the authorization entity 302 may engage the call-back 212 to communicate the CoA to the service provider 206. The authorization entity 302 may learn of the change in status and/or of a potential need for a CoA event by any of a variety of sources or avenues, such as from the database 208, from the RADIUS service 210, from the client device 204, and/or from some other device. Additionally or alternatively, the authorization entity 302 may recognize a potential need for a CoA event for some other reason, such as a time duration of the authorization expiring and triggering engagement of the call-back 212 to communicate the CoA to the service provider 206. As such, the example traffic flows 200A and 200B of FIGS. 2A and 2B represent some examples of how the authorization entity 302 may allow a call-back 212 to be used to signal a CoA to a service provider 206, either directly or indirectly.

Figure 3A:
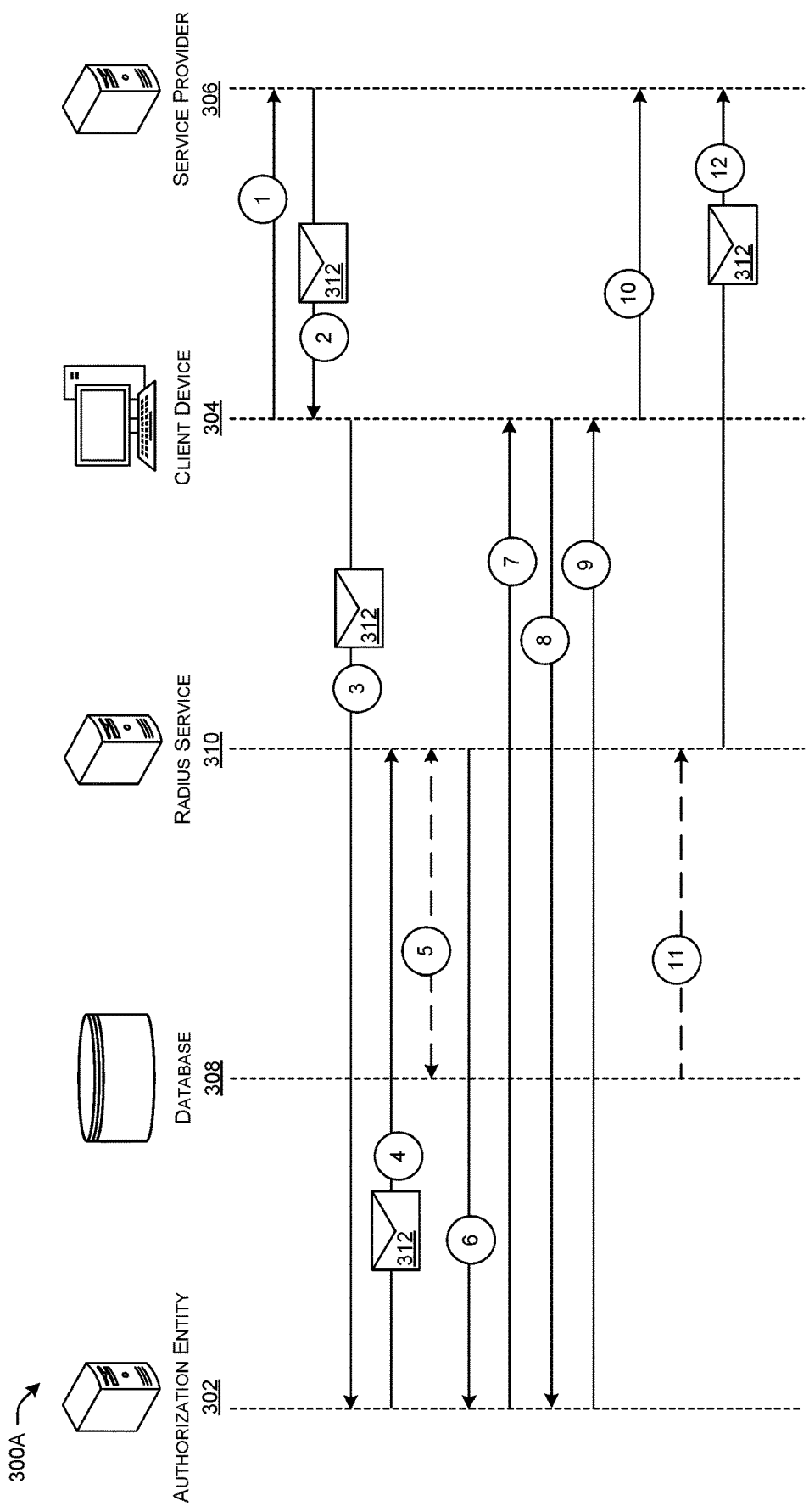
Figure 3B:
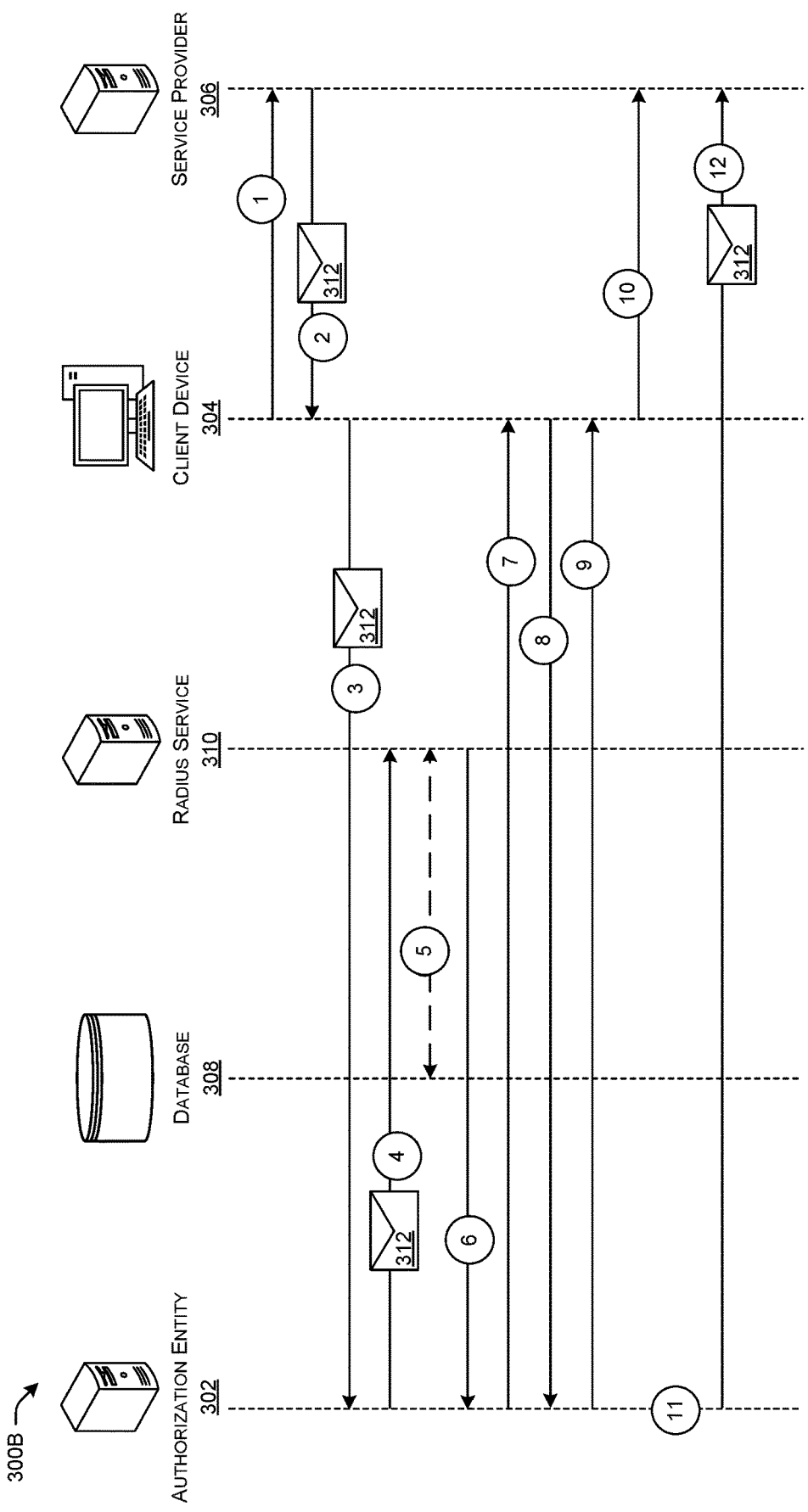

FIGS. 3A and 3B illustrate data flow diagrams of additional example traffic flows 300A and 300B, respectively, in accordance with the present concepts. Some aspects of the example traffic flows 300A and 300B shown in FIGS. 3A and 3B may be similar to aspects of the examples described above relative to FIGS. 1-2B. Therefore, for sake of brevity, not all elements of FIGS. 3A and 3B will be described in detail. As shown, the traffic flows 300A and 300B include various hardware and/or software resources similar to the traffic flows 200A and 200B of FIGS. 2A and 2B, such as an authorization entity 302, a client device 304 (e.g., user agent), a service provider 306, a database 308, and a RADIUS service 310, which may also be communicatively coupled to other devices.

In some examples, traffic flows 300A and 300B may be viewed as an approach to CoA events in systems that may include an OAuth 2.0 authorization framework. In OAuth 2.0, a resource owner (typically an end user through a user agent) may want to grant access to the owned resource to a client. The owned resource may be kept in a resource server. Therefore, in example traffic flows 300A and 300B, client device 304 may be viewed as interchangeable with a user agent, and service provider 306 may be viewed as representing a resource server in some instances.

At Step 1 of FIG. 3A, the client device 304 may be trying to access a resource at the service provider 306. An example communication at Step 1 may be represented as "GET resource user@realm."

At Steps 2 and 3 of FIG. 3A, the service provider 306 may return a redirect to the authorization entity 302 in Step 2, which is redirected to the authorization entity 302 in Step 3. The redirect may include a call-back 312. The redirect may be a URL containing an authorization request, which may include a client identity, a type of access requested, and an indication of a resource required. An example communication at Step 2 may be represented as "REDIRECT [sso.realm.com] Authorization request: resource, user, call-back[nonce]." An example communication at Step 3 may be represented as "GET auth, Authorization request: resource, user, callback[nonce]." Thus, call-back 312 is provided to the authorization entity 302. In the event of a CoA, the authorization entity 302 now has the means to directly or indirectly use the call-back 312 to get a message to the service provider 306 to warn the service provider 306 of the change.

Steps 4-6 of FIG. 3A are similar to Steps 4-6 of FIG. 2A, for instance, where the authorization entity 302 may interact with the RADIUS service 310 to perform AAA-related services and/or activities. At Step 6, the RADIUS service 310 may indicate to the authorization entity 302 that access is granted.

At Steps 7-10 of FIG. 3A, the process shown in example traffic flow 300A may differ from that shown in example traffic flow 200A of FIG. 2A, for instance. The differences in traffic flow may be related to the OAuth 2.0 authorization framework represented in traffic flow 300A (and 300B). The authorization entity 302 may interact with the end user for authentication (not shown). At Step 7, assuming the user is authorized, the authorization entity 302 may redirect the end user UA back to the client with an authorization grant, which in turn contains an authorization code. An example communication at Step 7 may be represented as "DATA response Authorization Grant[user, authorization code]."

At Step 8 of FIG. 3A, the client device 304 may then independently access the authorization entity 302. The client device 304 may providing the authorization grant, and may request an access token. An example communication at Step 8 may be represented as "GET token Authorization Grant [user, authorization code]."

At Step 9 of FIG. 3A, the authorization entity 302 may verify the validity of the authorization code in the authorization grant. If the authorization code is determined to be valid, the authorization entity 302 may return an access token to the client device 304. An example communication at Step 9 may be represented as "DATA response Access Token[user, authorization code]." Note that OAuth 2.0 may support variants of such a procedure where the authorization entity 302 may provide an authorization grant that includes the access token directly, thus avoiding Steps 8 and 9.

At Step 10 of FIG. 3A, the client device 304 may then request the resource from the service provider 306 (e.g., resource server), by providing the access token. An example communication at Step 10 may be represented as "DATA Access Token." The service provider 306 may then verify the access token validity, and if valid, return the requested resource.

At Step 11 of FIG. 3A, a CoA event may occur. For example, the RADIUS service 310 may detect a change of status of the user due to a posture change. In response, the RADIUS service 310 can engage the call-back 312 to communicate the CoA to the service provider 306, at Step 12. An example communication at Step 12 may be represented as "callback[nonce], POST COA." In response to receiving the CoA and/or call-back message, the service provider 306 may change the authorization for the user (e.g., subscriber). Different policies may be enforced due to the new authorization. In some cases, the service provider 306 may trust the call-back 312 process since the call-back 312 includes a signature from the authorization entity 302.

In some examples, OAuth 2.0 may define a token revocation endpoint in the authorization entity 302, which may signal to the authorization entity 302 to invalidate an existing token. However, the framework may not define an asynchronous call-back from the authorization entity 302 to the resource server to trigger an immediate revocation. Moreover, the framework may not define a procedure for CoA (i.e., change of the permissions associated with the token). The present concepts improve such CoA procedures.

Furthermore, a CoA endpoint may be defined for the resource owner that can be called by the authorization entity 302 (or another authorized entity) upon a revocation or CoA. An example of a CoA endpoint that may be called by the authorization entity 302 is shown in FIG. 3B. Such a CoA endpoint may be provided as a call-back URL (CBU) to the authorization entity 302 in the authorization request (e.g., Step 3 of example traffic flow 300B). Therefore, Step 11 of FIG. 3B may represent the authorization entity 302 responding to the CoA endpoint by engaging the call-back 312. In other implementations, example traffic flow 300B of FIG. 3B may represent another version of the authorization entity 302 engaging the call-back 312, such as by learning of a change in status of the client device 304.

To summarize, in accordance with the present techniques, a service provider may signal a call-back (e.g., call-back address) to a AAA service in order to facilitate CoA procedures. In some instances, when a CoA needs to be enforced, the call-back can be triggered to adjust an authentication and/or authorization. Thus, the present techniques allow AAA services to address continuously changing confidence in user identity and/or continuously changing authorizations for users consuming services provided by a service provider. Furthermore, the present techniques allow single-sign-on type protocols to accomplish the flexible and dynamic functionality of a RADIUS-type protocol to handle ongoing client-server sessions. For this reason, the present techniques are able to integrate, or bridge between, traditional protocols and newer, single-sign-on-type protocols.

Figure 4:
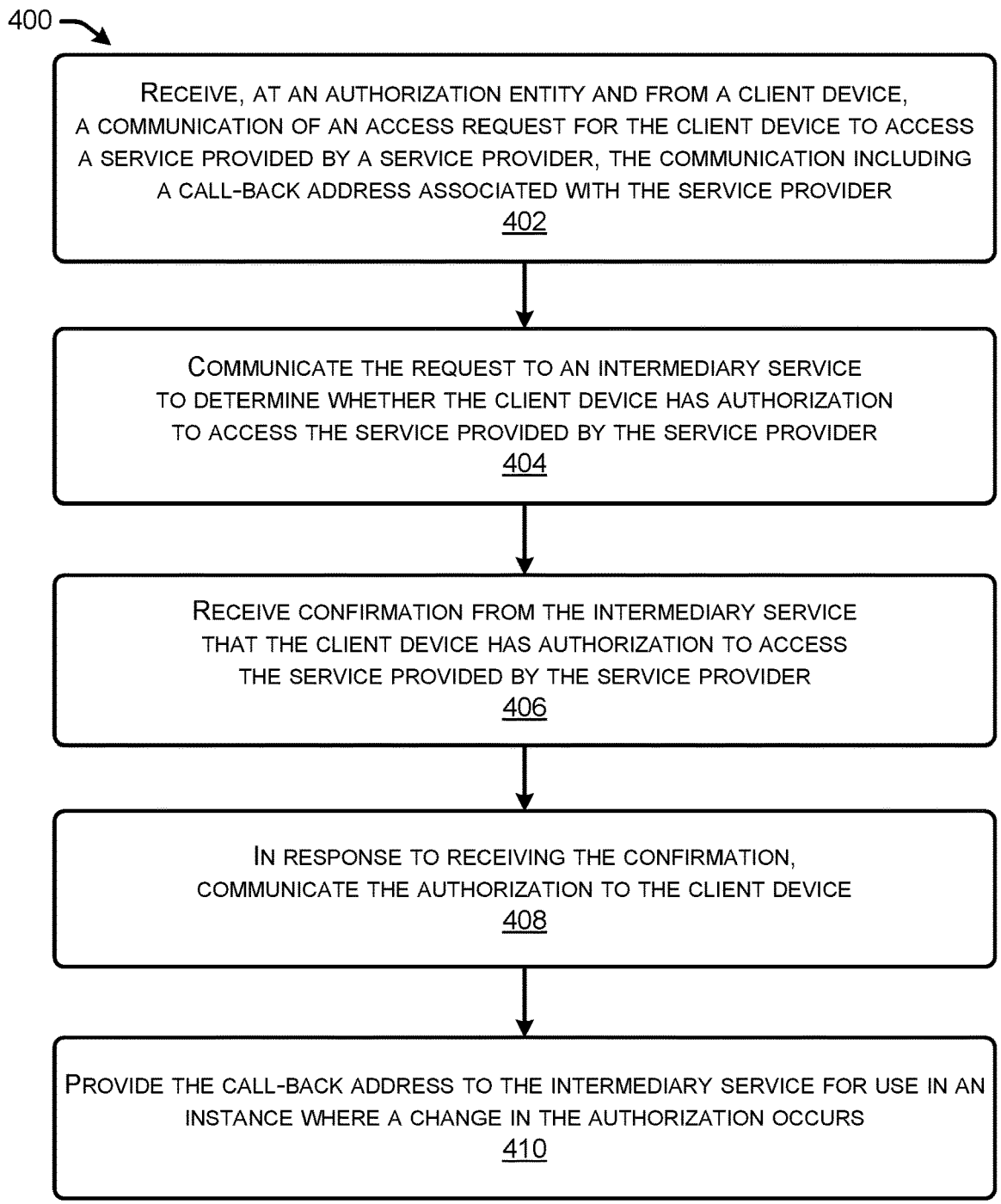

FIGS. 4-6 illustrate flow diagrams of example methods 400, 500, and 600 that include functions that may be performed at least partly by a network device, such as authorization entity 102, 202, or 302 and/or service provider 106, 206, or 306 described relative to FIGS. 1-3. The logical operations described herein with respect to FIGS. 4-6 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4-6 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 4 illustrates a flow diagram of an example method 400 for network devices to dynamically change authorization of a user. Method 400 may be performed by an authorization entity (e.g., authorization entity 102, 202, or 302) communicatively coupled to a client device (e.g., client devices 104, 204, or 304), an intermediary service (e.g., RADIUS service 210 or 310) and/or a service provider (e.g., service provider 106, 206, or 306), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving, at the authorization entity and from the client device, a communication of an access request for the client device to access a service provided by the service provider, the communication including a call-back address associated with the service provider.

At 404, method 400 may include communicating the request to the intermediary service to determine whether the client device has authorization to access the service provided by the service provider.

At 406, method 400 may include receiving confirmation from the intermediary service that the client device has authorization to access the service provided by the service provider.

At 408, in response to receiving the confirmation, method 400 may include communicating the authorization to the client device.

At 410, method 400 may include providing the call-back address to the intermediary service for use in an instance where a change in the authorization occurs. In some examples, the access to the service may be based at least in part on policy information related to the client device, and the change in the authorization may be based at least on new policy information related to the client device. Method 400 may also include providing the call-back address to the intermediary service by sending a message that includes the call-back address to the intermediary service. Method 400 may also include signing the message that includes the call-back address before sending the message to the intermediary service. In this manner, use of the call-back address for a change in the authorization may be trusted by the service provider, assuming the service provider trusts the authorization entity. In some examples, the message may be encoded as a SAML statement signed by the authorization entity. The message may also include the access request for the client device to access the service. In some examples, the call-back address may be a call-back universal resource locator (URL) associated with the service provider. The change in the authorization may comprise one or more of a variety of adjustments to, rather than revocation of the access, including an extension of time of the authorization of the client device to access the service provided by the service provider, an adjustment of the authorization of the client device to access more objects or operations related to the service provided by the service provider, a reinstatement of temporarily curtailed access to the service due to a change in posture of the client device, etc.

FIG. 5 illustrates a flow diagram of an example method 500 for network devices to dynamically change authorization of a user. Method 500 may be performed by a server device (e.g., authorization entity 102, 202, or 302) communicatively coupled to a client device (e.g., client devices 104, 204, or 304) and/or a service provider (e.g., service provider 106, 206, or 306), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving, at the server device and from the client device, a communication of a request for the client device to access a service provided by the service provider. The communication may include a call-back address associated with the service provider. In some examples, the call-back address may be a call-back universal resource locator (URL) associated with the service provider.

At 504, method 500 may include determining that the client device is authorized to access the service from the service provider.

At 506, method 500 may include sending an authorization notification to the client device based at least in part on determining that the client device is authorized to access the service.

At 508, method 500 may include determining that a change in authorization has occurred relative to the client device accessing the service. In some examples, the change in the authorization may represent an adjustment to the access of the client device, rather than a revocation or other cancellation of the access. For instance, the change in the authorization may comprise one or more of an extension of time of the authorization of the client device to access the service provided by the service provider, an adjustment of the authorization of the client device to access more objects or operations related to the service provided by the service provider, a reinstatement of temporarily curtailed access to the service due to a change in posture of the client device, or any of a wide variety of other changes.

At 510, based at least in part on the change in authorization, method 500 may include utilizing the call-back address to notify the service provider that the change in authorization has occurred. In some examples, the server device may provide the call-back address to an intermediary service to facilitate notifying the service provider that the change in authorization has occurred. Method 500 may include providing the call-back address to the intermediary service by sending a message that includes the call-back address to the intermediary service. In some examples, the message may be encoded as a SAML statement signed by an authorization entity, which may be embodied by the server device. The message may also include the access request for the client device to access the service. The server device may also sign the message that includes the call-back address before sending the message to the intermediary service. Thus, use of the call-back address for a change in the authorization may be trusted by the service provider.

FIG. 6 illustrates a flow diagram of an example method 600 for network devices to dynamically change authorization of a user. Method 600 may be performed by a service provider (e.g., service provider 106, 206, or 306) communicatively coupled to a client device (e.g., client devices 104, 204, or 304), and/or other devices. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include receiving, at the service provider and from the client device, a request for the client device to access a service provided by the service provider.

At 604, method 600 may include returning to the client device the request with redirect instructions and a call-back address related to the service provider.

At 606, method 600 may include receiving, at the service provider and from the client device, an indication of a trusted authorization for the client device to access the service provided by the service provider. Method 600 may also include determining that the trusted authorization is trusted based at least in part on the trusted authorization including a signature from a trusted authorization entity.

At 608, based at least in part on receiving the trusted authorization, method 600 may include granting access to the service by the client device.

At 610, method 600 may include receiving, at the service provider and from a third party, a communication indicating that a change in authorization has occurred relative to the access of the service by the client device. Method 600 may also include determining that the communication indicating that the change in authorization has occurred is trusted based at least in part on the communication including a signature from a trusted authorization entity.

At 612, based at least in part on the communication from the third party indicating that the change in the authorization has occurred, method 600 may include adjusting the access of the client device to the service provided by the service provider. In some examples, adjusting the access of the client device to the service comprises increasing number of objects or operations to which the client device has access within the service.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as an authorization entity 102, 202, or 302, a user agent or client device 104, 204, or 304, an intermediary or RADIUS service 210 or 310, and/or a resource server or service provider 106, 206, or 306. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be appreciated that the configuration of the data center 700 described with reference to FIG. 7 is merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in a computing network connecting the devices described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
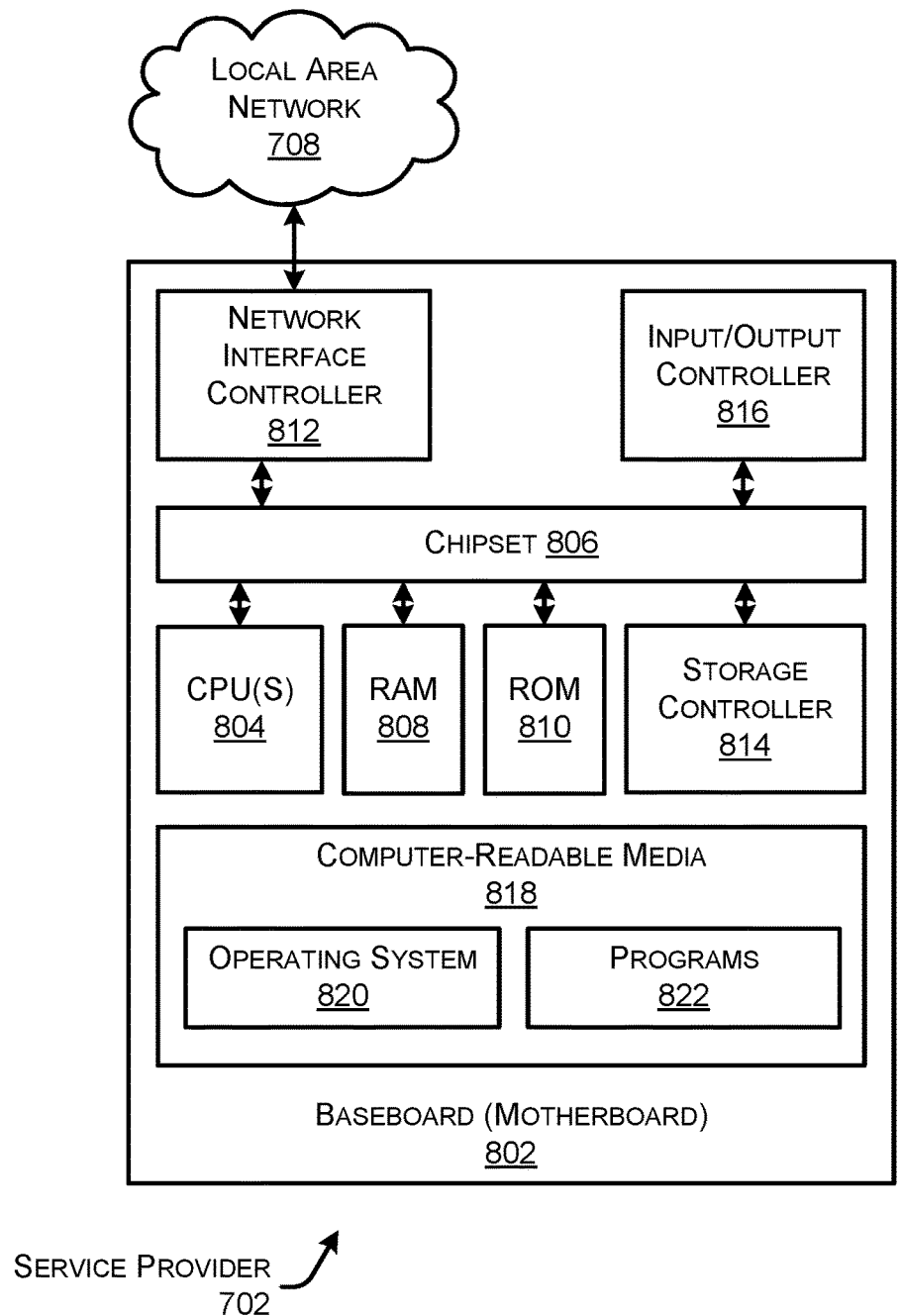
FIG. 8 is a computer architecture diagram showing an illustrative computer hardware architecture for implementing a device that can be utilized to implement aspects of the various technologies presented herein.

FIG. 8 shows an example computer architecture 800 for a computer 702 capable of executing program components for implementing the functionality described above. The computer architecture 800 shown in FIG. 8 illustrates a conventional server computer, workstation, desktop computer, laptop, tablet, network appliance, e-reader, smartphone, and/or other computing device, and can be utilized to execute any of the software components presented herein. The computer 702 may, in some examples, correspond to a physical device described herein (e.g., authorization entity, user agent, client device, intermediary service, RADIUS service, resource server, service provider, etc.), and may comprise networked devices such as servers, switches, routers, hubs, bridges, gateways, modems, repeaters, access points, etc. For instance, computer 702 may correspond to authorization entity 102, 202, or 302, or to service provider 106, 206, or 306.

As shown in FIG. 8, the computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708 or a cloud computing network. The chipset 806 can include functionality for providing network connectivity through a network interface controller (NIC) 812, such as a gigabit Ethernet adapter. The NIC 812 is capable of connecting the computer 702 to other computing devices over the network 708. For instance, in the example shown in FIG. 8, NIC 812 may help facilitate transfer of data, packets, and/or communications, such as call-back 108, over the network 708 and/or a cloud computing network with another device. It should be appreciated that multiple NICs 812 can be present in the computer 702, connecting the computer to other types of networks and remote computer systems.

The computer 702 can be connected to a storage device 814 that provides non-volatile storage for the computer. The storage device 814 can store an operating system 816, programs 818, call-backs, and/or other data. The storage device 814 can be connected to the computer 702 through a storage controller 822 connected to the chipset 806, for example. The storage device 814 can consist of one or more physical storage units. The storage controller 822 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 814 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 814 is characterized as primary or secondary storage, and the like.

For example, the computer 702 can store information to the storage device 814 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 814 by detecting the physical states or characteristics of one or more particular locations within the physical storage units.

In addition to the mass storage device 814 described above, the computer 702 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 702. In some examples, the operations performed by the network 708, and or any components included therein, may be supported by one or more devices similar to computer 702. Stated otherwise, some or all of the operations performed by the network 708, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 814 can store an operating system 816 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 814 can store other system or application programs and data utilized by the computer 702.

In one embodiment, the storage device 814 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regards to FIGS. 1-6. The computer 702 can also include computer-readable storage media having instructions stored thereupon for performing any of the other computer-implemented operations described herein.

The computer 702 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more devices, such as authorization entity 102, 202, or 302; service provider 106, 206, or 306; and/or other devices. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by authorization entity 102, 202, or 302; service provider 106, 206, or 306; and/or other devices. In some examples, the communications may include data, packet, request, call-back, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 818 may comprise any type of programs or processes to perform the techniques described in this disclosure in accordance with dynamically changing a user authorization. For instance, the programs 818 may cause the computer 702 to perform techniques for communicating with other devices using any type of protocol or standard usable for determining connectivity. Additionally, the programs 818 may comprise instructions that cause the computer 702 to perform the specific techniques for the dynamic change a user authorization described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving, at an authorization entity and from a client device, a communication of an access request for the client device to access a service provided by a service provider, the communication including a call-back address associated with the service provider;
communicating the request to an intermediary service to determine whether the client device has authorization to access the service provided by the service provider;
receiving confirmation from the intermediary service that the client device has authorization to access the service provided by the service provider;

in response to receiving the confirmation, communicating the authorization to the client device;

signing a message that includes the call-back address; and sending the message that includes the call-back address to the intermediary service for use in an instance where a change in the authorization occurs, such that use of the call-back address for the change in the authorization is trusted by the service provider.

2. The computer-implemented method of claim 1, wherein the access to the service is based at least in part on policy information related to the client device, and the change in the authorization is based at least on new policy information related to the client device.

3. The computer-implemented method of claim 1, wherein sending the message that includes the call-back address to the intermediary service enables the intermediary service to contact the service provider.

4. The computer-implemented method of claim 1, wherein the authorization communicated to the client device includes an authorization code that is compliant with OAuth 2.0.

5. The computer-implemented method of claim 1, wherein the message is encoded as a SAML statement signed by the authorization entity.

6. The computer-implemented method of claim 1, wherein the message also includes the access request for the client device to access the service.

7. The computer-implemented method of claim 1, wherein the call-back address is a call-back universal resource locator (URL) associated with the service provider.

8. The computer-implemented method of claim 1, wherein the change in the authorization comprises:
- an extension of time of the authorization of the client device to access the service provided by the service provider;
- an adjustment of the authorization of the client device to access an additional object or operation related to the service provided by the service provider; or
- a reinstatement of temporarily curtailed access to the service due to a change in posture of the client device.

9. A server device comprising:
one or more processors; and
one or more non-transitory computer-readable media storing computer-executable instructions that, when executed by the one or more processors, cause the one or more processors to:
- receive, at the server device and from a client device, a communication of a request for the client device to access a service provided by a service provider, the communication including a call-back address associated with the service provider;
- determine that the client device is authorized to access the service from the service provider;
- sign a message that includes the call-back address such that use of the call-back address for a change in the authorization is trusted by the service provider;
- send the message that includes the call-back address to an intermediary service;
- determine that a change in authorization has occurred relative to the client device accessing the service; and
- based at least in part on the change in authorization, utilize the call-back address to notify the service provider that the change in authorization has occurred.

10. The server device of claim 9, wherein the access to the service is based at least in part on policy information related to the client device, and the change in the authorization is based at least on new policy information related to the client device.

11. The server device of claim 10, wherein sending the message that includes the call-back address to the intermediary service enables the intermediary service to contact the service provider.

12. The server device of claim 9, wherein the computer-executable instructions further cause the one or more processors to:
send an authorization notification to the client device based at least in part on determining that the client device is authorized to access the service.

13. The server device of claim 12, wherein the authorization notification sent to the client device includes an authorization code that is compliant with OAuth 2.0.

14. The server device of claim 13, wherein the computer-executable instructions further cause the one or more processors to:
- in response to sending the authorization code to the client device, receive a token request from the client device; and
- in response to receiving the token request, send an access token to the client device in compliance with OAuth 2.0.

15. The server device of claim 9, wherein the call-back address is a call-back universal resource locator (URL) associated with the service provider.

16. The server device of claim 9, wherein the change in the authorization comprises:
- an extension of time of the authorization of the client device to access the service provided by the service provider;
- an adjustment of the authorization of the client device to access an additional object or operation related to the service provided by the service provider; or
- a reinstatement of temporarily curtailed access to the service due to a change in posture of the client device.

17. A method comprising:
- receiving at a service provider and from a client device, a request for the client device to access a service provided by the service provider;
- returning to the client device the request with redirect instructions and a call-back address related to the service provider;
- receiving at the service provider and from the client device, an indication of a trusted authorization for the client device to access the service provided by the service provider;
- based at least in part on receiving the trusted authorization, granting access to the service by the client device in a user session;
- receiving at the service provider and from a third party, a communication indicating that a change in authorization has occurred relative to the access of the service by the client device;
- determining that the communication indicating that the change in authorization has occurred is trusted based at least in part on the communication including a signature from a trusted authorization entity; and
- based at least in part on determining that the communication indicating that the change in the authorization has occurred is trusted, adjusting the access of the client device to the service provided by the service provider in the user session.

18. The method of claim 17, further comprising:
determining that the trusted authorization is trusted based at least in part on the trusted authorization including a signature from a trusted authorization entity.

19. The method of claim 17, wherein adjusting the access of the client device to the service comprises a reinstatement of the authorization or an extension of time of the authorization of the client device to access the service.

20. The method of claim 17, wherein adjusting the access of the client device to the service comprises increasing a number of objects or operations to which the client device has access within the service in the user session.

\* \* \* \* \*